United States Patent
Cohen et al.

(10) Patent No.: US 8,738,618 B2
(45) Date of Patent: May 27, 2014

(54) METHODS AND SYSTEMS TO ESTIMATE QUERY RESPONSES BASED ON DATA SET SKETCHES

(75) Inventors: Edith Cohen, Berkeley Heights, NJ (US); Haim Kaplan, Hod Hasharon (IL)

(73) Assignee: AT&T Intellectual Property I, L.P., Atlanta, GA (US)

( * ) Notice: Subject to any disclaimer, the term of this patent is extended or adjusted under 35 U.S.C. 154(b) by 619 days.

(21) Appl. No.: 12/334,152

(22) Filed: Dec. 12, 2008

(65) Prior Publication Data

US 2010/0153387 A1   Jun. 17, 2010

(51) Int. Cl.
    *G06F 17/30*   (2006.01)

(52) U.S. Cl.
    USPC .................. 707/736; 707/713; 707/693

(58) Field of Classification Search
    USPC .................................. 707/769, 736
    See application file for complete search history.

(56) References Cited

U.S. PATENT DOCUMENTS

| | | | |
|---|---|---|---|
| 5,752,241 A | | 5/1998 | Cohen |
| 6,108,651 A | * | 8/2000 | Guha ........................ 1/1 |
| 6,654,039 B1 | * | 11/2003 | Hollines et al. ............. 715/830 |
| 6,993,535 B2 | | 1/2006 | Bolle et al. |
| 7,158,961 B1 | | 1/2007 | Charikar |
| 7,188,106 B2 | | 3/2007 | Dwork et al. |
| 7,266,545 B2 | | 9/2007 | Bergman et al. |
| 7,328,216 B2 | | 2/2008 | Hofmann et al. |
| 7,363,299 B2 | | 4/2008 | Dalvi et al. |
| 2004/0044662 A1 | * | 3/2004 | Ganesan et al. ............. 707/5 |
| 2006/0161529 A1 | * | 7/2006 | Venguerov ................... 707/3 |
| 2006/0161579 A1 | * | 7/2006 | Venguerov ................ 707/102 |
| 2008/0010240 A1 | * | 1/2008 | Zait ............................. 707/2 |
| 2010/0063948 A1 | * | 3/2010 | Virkar et al. ............... 706/12 |

OTHER PUBLICATIONS

"Summarizing Data using Bottom-k Sketches" by Edith Cohen, AT&T Labs-Research, Aug. 12, 2007.*
Alon, Noga, et al., "Estimating Arbitrary Subset Sums with Few Probes", *PODS'05*, (Jun. 2005), 317-325.
Cohen, Edith, et al., "Algorithms and Estimators for Accurate Summarization of Internet Traffic", *IMC'07*, (Oct. 2007), 265-278.
Cohen, Edith, et al., "Algorithms and Estimators for Summarization of Unaggregated Data Streams", [Online]. Retrieved from the Internet: <URL: http://www.research.att.com/~edith/Papers/unaggstreams.pdf>, (Sep. 10, 2007), 1-39 pgs.

(Continued)

*Primary Examiner* — Mariela Reyes
*Assistant Examiner* — Mohammad Rahman
(74) *Attorney, Agent, or Firm* — Hanley, Flight & Zimmerman, LLC

(57) ABSTRACT

Methods and systems for estimate derivation are described. In one embodiment, a query may be received with a predicate for sets over a collection of items. Associated samples associated with the query may be accessed. Items of an associated sample may be accessed from the collection of items. A determination of whether the predicate is an attribute-based selection from a union of at least some sets may be made. Available items of the particular associated sample may be selected from the items. Identified items may be identified among the available items in the associated sample that satisfy the predicate. An adjusted weight may be assigned to an item based on a weight of the item and a distribution of the associated samples. An estimate may be generated based on the adjusted weight of the identified items of the associated samples that satisfy the predicate. Additional methods and systems are disclosed.

24 Claims, 16 Drawing Sheets

(56) References Cited

OTHER PUBLICATIONS

Cohen, Edith, et al., "Bottom-k Sketches: Better and More Efficient Estimations of Aggregates", *SIGMERICS'07*, (Jun. 2007), 353-354.

Cohen, Edith, et al., "Efficient Estimation Algorithms for Neighborhood Variance and Other Moments", *Association for Computing Machinery*, (2004), 157-166.

Cohen, Edith, et al., "Processing Top-K Queries from Samples", *ACM*, (2006), 15 pgs.

Cohen, Edith, et al., "Sketching Unaggregated Data Streams for Submopulation-Size Queries", *PODS'07*, (Jun. 2007), 253-262.

Cohen, Edith, et al., "Summarizing Data using Bottom-k Sketches", *PODC'07*, (Aug. 2007), 225-234.

Cohen, Edith, et al., "Tighter Estimation using Bottom-k Sketches", *VLDB'08*, (Aug. 2008), 17 pgs.

Duffield, Nick, et al., "Priority Sampling for Extimation of Arbitrary Subset Sums", *Journal of the ACM*, vol. 54, No. 32, (Dec. 2007), 32:1-32:37.

Goldberg, Sharon, et al., "Path-Quality Monitoring in the Presence of Adversarues", *SIGMETRICS* Jun. 2-6, 2008, 193-204.

Hua, Ming, et al., "Efficiently Answering Top-k Typicality Queries on Large Databases", *VLDB'07*, (Sep. 2007), 890-901.

Sirkin, Monroe, et al., "The Horvitz-Thompson Estimator in Poluation Based Establishment Sample Surveys", *Proceedings of the Survey Research Methods Section, American Statistical Association*, [Online]. Retrieved from the Internet: <URL:http://www.amstat.org/Sections/Srms/Proceedings/papers/1999_038.pdf>, (Dec. 1999), 233-237.

Weiss, Jack, "Lecture 9", [Online]. Retrieved from the internet: <URL:http://www.unc.edu/courses/2007/spring/enst/562/001/docs/lectures/lecture9.htm>, (Jan. 31, 2007), 5 pgs.

\* cited by examiner

| Item | $I_7$(0.131) | $I_4$(0.208) | $I_2$(0.36) | $I_3$(0.3) | $I_{10}$(0.341) | $I_1$(0.487) | $I_6$(0.599) | $I_9$(0.73) | $I_5$(0.765) | $I_8$(0.886) |
|---|---|---|---|---|---|---|---|---|---|---|
| $A_1$ | v | x | x | v | x | v | x | v | v | x |
| $A_2$ | x | x | v | x | v | x | v | v | v | x |
| $A_3$ | v | v | x | v | x | x | v | x | v | x |
| $A_4$ | x | v | v | x | v | x | v | x | x | v |

FIGURE 7

| S | combination type | content | # of items |
|---|---|---|---|
| $A_1, A_2$ | $S_3(\cup_{A \in S} A, r)$ | $i_7(0.131), i_2(0.36), i_3(0.3)$ | 3 |
| $A_1, A_2$ | $SCS_3(S, r)$ | $i_7(0.131), i_2(0.36), i_3(0.3), i_{10}(0.341), i_1(0.487), i_6(0.599)$ | 6 |
| $A_1, A_2$ | $LCS_3(S, r)$ | $i_7(0.131), i_2(0.36), i_3(0.3), i_{10}(0.341), i_1(0.487), i_6(0.599)$ | 6 |
| $A_1, A_2, A_3, A_4$ | $S_3(\cup_{A \in S} A, r)$ | $i_7(0.131), i_4(0.208), i_2(0.36)$ | 3 |
| $A_1, A_2, A_3, A_4$ | $SCS_3(S, r)$ | $i_7(0.131), i_4(0.208), i_2(0.36), i_3(0.3), i_{10}(0.341), i_1(0.487)$ | 6 |
| $A_1, A_2, A_3, A_4$ | $LCS_3(S, r)$ | $i_7(0.131), i_4(0.208), i_2(0.36), i_3(0.3), i_{10}(0.341), i_1(0.487), i_6(0.599)$ | 7 |

FIGURE 9

| $i_j$ | $I_7$ | $I_4$ | $I_2$ | $I_3$ | $I_{10}$ | $I_1$ | $I_6$ |
|---|---|---|---|---|---|---|---|
| $f(S, r, i_j)$ | 1 | 4 | 2 | 1 | 2 | 1 | 2 |
| $\tau(S, r, i_j)$ | 0.73 | 0.599 | 0.73 | 0.73 | 0.73 | 0.73 | 0.73 |
| $A^{(LCS)}(i_j)$ | 1.37 | 3 | 2 | 1.37 | 1.37 | 1.37 | 1.37 |

FIGURE 12

| Item | $i_1$ | $i_2$ | $i_3$ | $i_4$ | $i_5$ | $i_6$ | $i_7$ | $i_8$ | $i_9$ | $i_{10}$ |
|---|---|---|---|---|---|---|---|---|---|---|
| $w_j$ | 1 | 2 | 1 | 3 | 1 | 1 | 1 | 1 | 1 | 1 |
| union | 0 | 2.93 | 2.93 | 0 | 0 | 0 | 2.93 | 0 | 0 | 0 |
| SCS/LCS | 1.37 | 2 | 1.37 | 0 | 0 | 1.37 | 1.37 | 0 | 0 | 1.37 |

FIGURE 13

| | condition | Relevant sets S | items | weight | RC union | RC SCS | RC LCS | selection |
|---|---|---|---|---|---|---|---|---|
| $P_1$ | $i_j \in \bigcup_{i \in [2]} A_i \wedge (j < 8 \vee j \geq 4)$ | $A_1, A_2$ | $i_5, i_6, i_7$ | 3 | 2.93 | 2.74 | 2.74 | $LCS_3$ |
| $P_2$ | $i_j \in \bigcap_{i \in [2]} A_i \wedge (j < 8 \vee j \geq 4)$ | $A_1, A_2$ | $i_5$ | 1 | 0 | 1.37 | - - - | $SCS_3$ |
| $P_3$ | $i_j \in$ at least two out of $A_1, \ldots, A_4$ | $A_1, A_2, A_3, A_4$ | $i_1, \ldots, i_7, i_9, i_{10}$ | 12 | 10 | 11.68 | - - - | $SCS_3$ |
| $P_4$ | $i_j \in \bigcup_{i \in [4]} A_i \wedge j$ is odd | $A_1, A_2, A_3, A_4$ | $i_1, i_3, i_5, i_7, i_9$ | 5 | 3.33 | 5 | 4.1 | $LCS_3$ |

FIGURE 15

METHODS AND SYSTEMS TO ESTIMATE QUERY RESPONSES BASED ON DATA SET SKETCHES

FIELD

This application relates to methods and systems for data processing and, more specifically, to methods and systems for estimate derivation from sampled data.

BACKGROUND

Exact computation of queries involve retrieving the full content of all data sets relevant to a predicate, computing the union, applying the predicate to all items in the union, and adding up the weights of items that satisfy the predicate. This procedure is typically too costly or infeasible for massive or distributed data. In some cases, the full data set may no longer be available at the time the query is formulated.

BRIEF DESCRIPTION OF THE DRAWINGS

FIG. 7 is a block diagram of an example chart showing the items of FIG. 5 sorted by increasing ranks, according to an example embodiment;

FIG. 9 is a block diagram of a comparison chart, according to an example embodiment;

FIGS. 10-12 are block diagrams of charts of adjusted weight computations, according to example embodiments;

FIGS. 13 and 14 are block diagrams of charts of adjusted weights, according to example embodiments;

FIG. 15 is a block diagram of predicates, according to an example embodiment.

DETAILED DESCRIPTION

Example methods and systems for estimate derivation are described. In the following description, for purposes of explanation, numerous specific details are set forth in order to provide a thorough understanding of example embodiments. It will be evident, however, to one of ordinary skill in the art that embodiments of the invention may be practiced without these specific details.

Data sets, including market basket data, text or hypertext documents, and measurements collected in different nodes or time periods, may be modeled as a collection of sets A over a ground set I of weighted items. Exact computation on large data sets may be inefficient or infeasible. A concise summary of the data sets in the form of a sample or sketch may be used to approximate query processing of the original data sets.

Tighter estimates may be derived using statistical summarization that leverages samples that are present in the union of sketches of applicable sets but excluded from the sketch of the union of the sets. The estimates may retain the desirable properties of basic single-sketch estimates (e.g., unbiasedness), and for all queries and data sets, perform at least as well. These estimators are applicable to a set of coordinated bottom-k samples. In an example embodiment, the estimates are more powerful and provide a reduction in estimation error over that of a single-sample estimator applied to the union sample.

In an example embodiment, a set of relevant sets $S \subset A$ for a predicate P is a set of sets that suffices to determine the items that satisfy P. For example, for the query "term is present in at least 2 out of books A, B, C," the relevant sets are A, B, and C. The query "term present in A and not in C" has relevant sets A and C. In both cases, the sets may be deemed to be minimum relevant sets. The first step of processing the query for P may include determining a minimal set S of relevant sets.

Combinations of items included in the sketches of S that enable estimating $\Sigma_{i \in I | P(i)} w(i)$ based on evaluation of $\Sigma_{i | P(i)} a(i)$ over items included in the combination may include a short combination sketch (SCS) or a long combination sketch (LCS).

The SCS(S) includes full membership information in S sets for all items. P(i) is then to be evaluated for all $i \in SCS$ for general P. For $i \in LCS$, membership information of i is determined in sets $A \in S$ such that $r(i) \leq r_{k+1}(A)$.

The LCS is applied to predicates P that have the form of an attribute-based condition over items in $\cup_{A \in S} A$ where the combination is applicable to all rank assignments.

Figure 1:
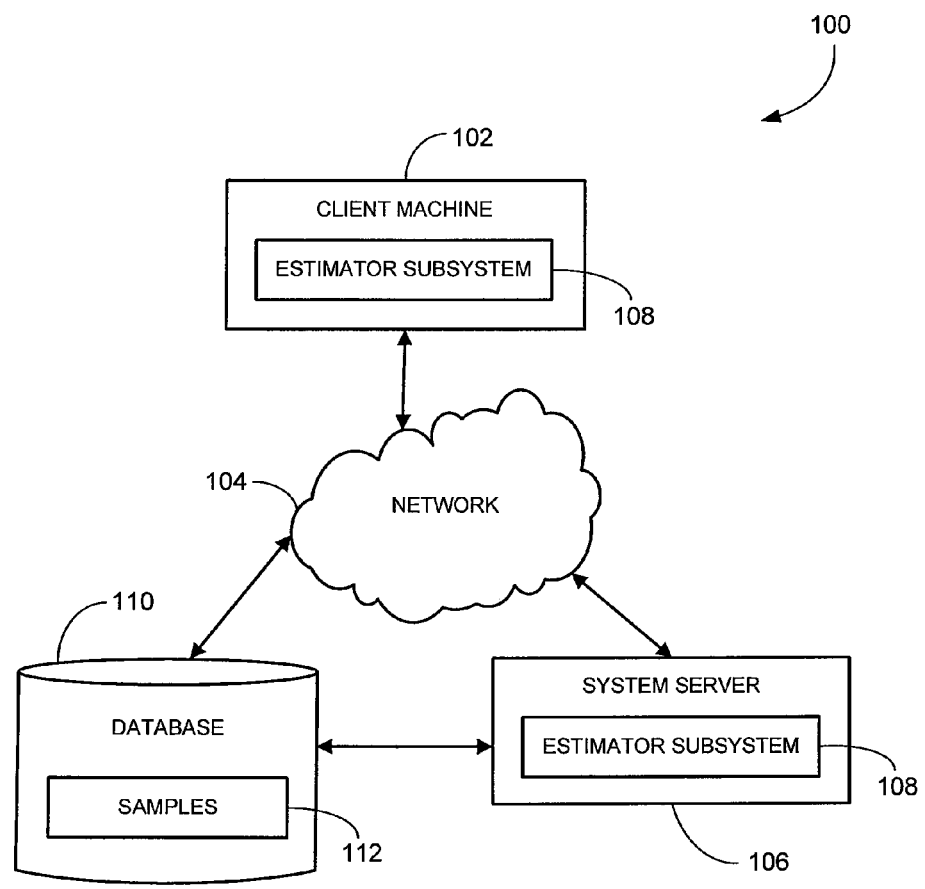
FIG. 1 is a block diagram of a system, according to an example embodiment.

FIG. 1 illustrates an example system 100 in which a user may operate a client machine 102 to communicate over a network 104 with a system server 106 to receive an estimate. The system 100 may enable the user of an organization or entity associated with the system server 106 to receive an estimate by directly communicating with the system server 106, or communicating with the system server 106 from the client machine 102.

Examples of the client machine 102 include a gaming unit, a receiver card, a set-top box (STB), a mobile phone, a personal digital assistant (PDA), a display device, a generic computing system, or the like. Other devices may also be used.

The network 104 over which the client machine 102 and the system server 106 are in communication may include a Global System for Mobile Communications (GSM) network, an Internet Protocol (IP) network, a Wireless Application Protocol (WAP) network, a WiFi network, or an IEEE 802.11 standards network, as well as various combinations thereof. Other conventional and/or later developed wired and wireless networks may also be used.

The system server 106 may be a computing system or other computing device operated or under control of AT&T, or another telecommunication entity or non-telecommunication entity. The system server 106 may be in a client-server relationship, peer-to-peer, or different type of relationship with the client machine 102.

An estimator subsystem 108 may be deployed in the client machine 102 and/or the system server 106 to generate an estimate from a number of data sets. The data sets may be modeled as a collection S of possibly intersecting sets, defined over a ground set I of weighted items. Examples of such datasets are documents (e.g., over the set of words in the corpus, according to the presence of the word in the document), a set of Web pages (e.g., over Web pages, according to embedded hyperlinks), market baskets (e.g., over goods, according to the presence of the good in the basket), sets of events observed at different sensor nodes or time periods (e.g., over a set of possible events, according to the presence of the event), respective inverted sets, and the like. The data sets may have intersections where items appear in multiple data sets.

The system server 106 may be in communication with a database 110. The database 110 may include samples 112 (or sketches) that have been generated from the items in the data sets. The data sets may not have been retained by the system server 106.

Figure 2:
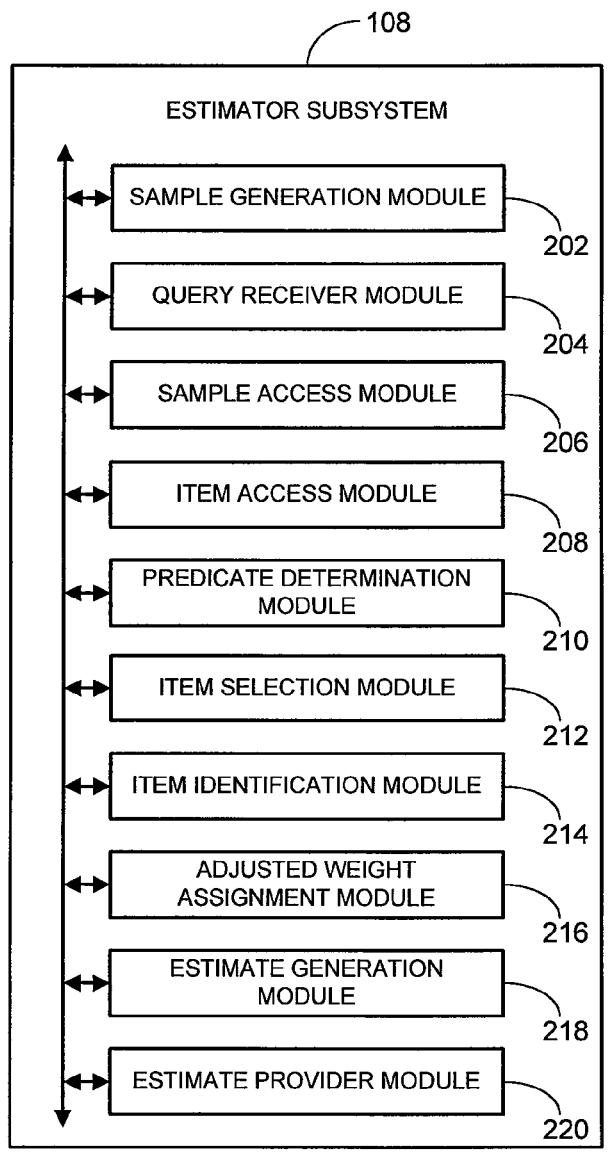
FIG. 2 is a block diagram of an estimator subsystem that may be deployed within the system of FIG. 1, according to an example embodiment.

FIG. 2 illustrates an example estimator subsystem 108 that may be deployed in the client machine 102 and/or the system server 106 of the system 100 (see FIG. 1), or otherwise deployed in another system. The estimator subsystem 108 may include a sample generation module 202, a query receiver module 204, a sample access module 206, an item access module 208, a predicate determination module 210, an item selection module 212, an item identification module 214, an adjusted weight assignment module 216, an estimate generation module 218, and/or an estimate provider module 220. Other modules may also be included. In various embodiments, the modules may be distributed so that some of the modules may be deployed in the client machine 102 and some of the modules may be deployed in the system server 106.

The sample generation module 202 generates samples from a group of items arranged in a number of data sets. The generated samples may be coordinated by having a set of sketches, one for each set data set, because independent samples for different sets may result in weak estimates. The coordinated sample format may be used for distributed applications, data streams that can be processed independently, or may be otherwise used. The k-mins technique and the bottom-k technique may be used to generate k-mins sketches and bottom-k sketches respectively. The k-min sketches or bottom-k sketches of sets are coordinated when they have been produced using the same ranks assigned to the items in a ground set.

Coordinated k-min and bottom sketches may be computed efficiently for a wide variety of applications. Data sources may be centrally stored or distributed, and sets can be explicitly or implicitly represented. Explicit representations (e.g., item-basket associations in a market basket data, links in web pages, and features in documents) list the occurrence of each item in each set. Explicit representations may use random hash functions for efficiently assigning consistent rank values to items. Implicit representations (e.g., a peer-to-peer (P2P) example application) are such that set memberships are specified indirectly. For example, items may be associated with locations, and sets may be neighborhoods in a metric space. Implicit representation may be smaller than the corresponding explicit representation. The metric space may be, by way of example, a graph, the Euclidean plane, a network, or the time axis (data streams). Sets may include all items within some distance from a location or with a time stamp that is within some elapsed time from the current time.

When multiple distances (e.g., neighborhoods) for each location are desired, all-distances sketches may be used to represent the coordinated sketches of all neighborhoods of a location. The all-distances sketches of multiple locations may be coordinated when they share the same underlying rank assignments. Coordinated all-distances sketches may be computed efficiently over the implicit representation of the dataset.

Coordinated bottom-k and k-mins sketches have the property that for any collection of sets, $S \subset A$, a respective sketch (e.g., a bottom-k or k-mins) of the union in $\cup_{A \in S} A$ may be constructed from the sketches of the sets in S. By looking at the sketches of the sets in S, for each item x that is included in the union sketch and each set $A \in S$, a determination may be made of whether A contains x. The determination property may facilitate a union-sketch reduction that enables an application of a subpopulation weight estimator that is applicable to a single bottom-k sketch (e.g., including recent tighter estimators) to subpopulations specified by arbitrary predicates (with both attribute and membership based conditions) over coordinated sketches of multiple sets.

In an example embodiment, a weighted set (I,w) consists of a set of items I and a weight function w assigning a $w(i) \geq 0$ to each item $i \in I$. A rank assignment maps each item i to a random rank r(i). The ranks of items are drawn independently using a family of distributions $f_w (w>0)$, where the rank of an item with weight w(i) is drawn according to $f_{w(i)}$. For a set J and a rank assignment r denoted by $r_i(J)$ the ith smallest rank of an item in J is abbreviated and written $r(J)=r_1(J)$. Random rank assignments may be used to obtain sketches of sets as follows.

The k-mins sketch of a set J may be produced from k independent rank assignments, $r^{(1)}, \ldots, r^{(k)}$. The sketch of a set J includes the k-vector $(r^{(1)}(J), r^{(2)}(J), \ldots, r^{(k)}(J))$. Attributes associated with the corresponding item may be stored with each of the ranks.

A bottom-k sketch of a set J may be defined based on a single rank assignment r as follows. Let $i_1, \ldots, i_k$ be the k items of smallest ranks in J. The sketch consists of k pairs $(r(i_j), w(i_j)), j=1, \ldots, k$, and $r_{k+1}(J)$. (If $|J| \leq k$ only $|J|$ pairs may be stored.) A bottom-k sketch of a set A may be denoted with respect to a rank assignment r by $s_k(A, r)$. For example, a set A of sets may be over a set of items I. Coordinated k-mins or bottom-k sketches may be obtained by using the same rank assignment over I (for k-mins sketches, same set of rank assignments), when producing the sketches of all sets $A \in A$. Coordinated sketches may include all rank values and items' weights. When interested in predicates with membership-based conditions, item attribute values in the sketches may be excluded.

Coordinated bottom-k and k-mins sketches may have the property that for a set $S \subset A$. of sets, the sketch of $\cup_{A \in S} A$ may be computed from the sketches of the sets $A \in S$. For k-mins sketches, a sketch of the union may contain the item with minimum rank value across sets in S for each rank function. For bottom-k sketches, the items in $s_k (\cup_{A \in S} A, r)$ may be the items with k smallest ranks in $\cup_{A \in S} s_k(A,r)$. $r_{k+1}(\cup_{A \in S} A)$ may be the minimum rank of an item that is among the (k+1) smallest ranks in at least one of A in S but may not be among the k smallest ranks in the union sketch. Therefore, $r_{k+1} (\cup_{A \in S} A)$ may also be determined from the sketches of A in S.

The union-sketch may enable application of a subpopulation weight estimate designed for attribute-based select predicates and applicable to a single sketch (e.g., k-mins or bottom-k) to estimate the weight of a subpopulation specified by a general select predicate (e.g., with membership and attribute-based conditions) over coordinated sketches (e.g., k-mins or bottom-k) of a collection of sets S.

Rank functions $f_w$ with some convenient properties are exponential distributions with parameter w. The density function of this distribution may be $f_w(x)=we^{-wx}$, and its cumulative distribution function is $F_w(x)=1-e^{-wx}$. If $u \in U$ then $-\ln(u)/w$ may be an exponential random variable with parameter w. The minimum rank $r(J)=\min_{i \in J} r(i)$ of an item in a set $J \subset I$ is exponentially distributed with parameter $w(J)=\Sigma_{i \in J} w(i)$. The minimum of independent exponentially distributed random variables may be exponentially distributed with parameter equal to the sum of the parameters of these distributions.

With exponential ranks, an item with the minimum rank r(J) may be a weighted random sample from J. The probability that an item i∈J may have the minimum rank item is w(i)/w(J). Therefore, a k-mins sketch of a set J may correspond to a weighted random sample of size k, drawn with replacement from J. A k-mins sketch using exponential ranks may be designated a WSR sketch. A bottom-k sketch of a set J with exponential ranks may correspond to a weighted k-sample drawn without replacement from J and may be designated a WS sketch.

The query receiver module 204 receives a query with a predicate for a number of sets over a collection of items. Basic queries over the data sets may include weight and selectivity of subpopulations: The query specifies a subpopulation of I by a selection predicate over items. The result of a weight query is the sum of the weights of the items that are members of the subpopulation.

An example of a weight query is the number of words that are both in document A and in document B and are at least 5 characters long. Selectivity queries are defined with respect to some (sub) collection of sets. The result of a selectivity query is the ratio of the sum of the weights of all items in the union of these sets for which the predicate holds and the total weight of the union of these sets.

The sample access module 206 accesses samples associated with the query. The associated samples may be accessed locally (e.g., from the database 110) or remotely (e.g., peer-to-peer or one or more servers). The associated samples may be accessed by accessing the samples 112 and identifying the samples 112 associated with the query as associated samples.

The item access module 208 accesses items of the samples 112 from the collection of items. The predicate determination module 210 determines whether the predicate is an attribute-based selection from a union of at least some of the sets.

In an example embodiment, attribute-based conditions are based on properties available through an identifier of the item (e.g., color, size, zip code, etc.), while membership-based conditions are based on the item's set memberships. For example, the weight of the intersection of two documents A,B is specified using the predicate with membership-based conditions "in A and in B". The predicate "in A and not in B and length≥5" has both attribute-based (length of a word) and membership-based conditions.

The item selection module 212 selects the available items of the sample 112. All or substantially all of the available items may be selected based on a determination that the predicate is an attribute-based selection. Some of the available items of the associated samples may be selected based on item rankings, and a particular item ranking of the item rankings may be associated with a particular available item of the available items. The selection may be made based on a determination of whether or not the predicate is an attribute-based selection.

The item identification module 214 identifies items in the samples 112 that satisfy the predicate. The adjusted weight assignment module 216 assigns an adjusted weight to identified items. The adjusted weight may be assigned based on a weight of an item and a distribution of the associated samples. The adjusted weight may be assigned based on a weight of an item, a distribution of the associated samples, and a result of a distribution function associated with the weight of the item.

The estimate generation module 218 generates an estimate based on the adjusted weight of the identified items of the associated samples that satisfy the predicate. The estimate provider module 220 provides the estimate in response to receiving the query.

By way of example, if the accessed samples by sample access module 206 include a set of coordinated bottom-k sketches $s_k(A, r)$ for sets $A \subset I$, $A \in \mathcal{A}$, and a weight query specified by a predicate P:I is received by the query receiver module 204, the desired output generated by the estimate generation module 218 may be an estimate of $\Sigma_{i \in I | P(i)} w(i)$.

Figure 3:
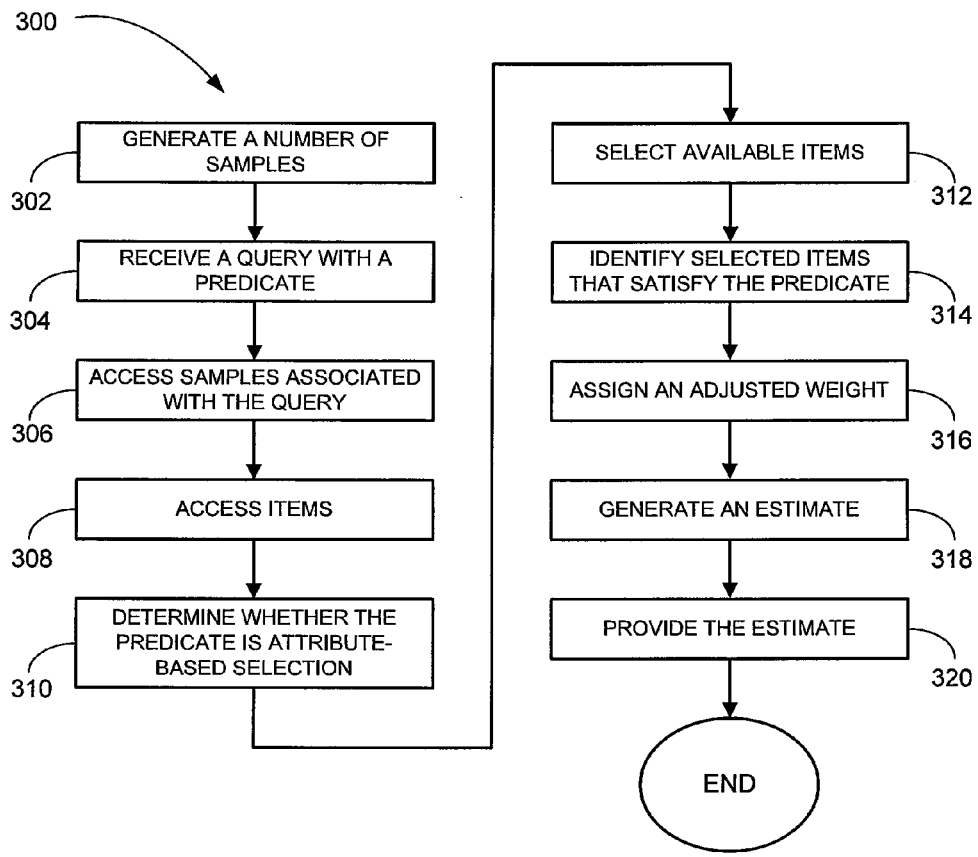
FIGS. 3 and 4 are flowcharts illustrating methods for estimate generation, according to example embodiments.

FIG. 3 illustrates a method 300 for estimate generation according to an example embodiment. The method 300 may be performed by the client machine 102 and/or the system server 106 of the system 100 (see FIG. 1), or otherwise performed. The method 300 is an example implementation using a long combination sketch (LCS).

A number of samples may be generated from a collection of items at block 302. The samples may be generated using a bottom-k function, a hash function, or may be generated otherwise.

In an example embodiment, the bottom-k function or hash function may be used to coordinate the samples. For example, the use of the bottom-k function or hash function may assign each item in the data sets a random rank value. The same item may be assigned a global rank by having the same random rank in all of the subsets. The summary of the subsets may be a certain number of items (e.g., 100 items) with the smallest rank.

The generated samples may be weighted samples. The weighting may be based on an attribute of the items in the data set that are to be sampled. For example, if the items in the data set are movies, the samples may be weighted based on sizes of the movies, storage requirements of the movies, or the like.

A query with a predicate is received for a number of sets over a collection of items at block 304. Some of the sets may be overlapping where one or more of the items are included in multiple sets.

Samples that are associated with the query are accessed at block 306. The associated samples may be accessed by accessing a number of samples and identifying those samples associated with the query as the associated samples. The samples are accessed from multiple different databases or servers, from the same database or server, or may be otherwise accessed. In an example embodiment, a first associated sample is associated with a first particular data set, and a second associated sample is associated with a second particular data set.

Items of associated samples are accessed from the collection of items at block 308.

A determination of whether the predicate is an attribute-based selection from a union of at least some sets of the plurality sets is made at block 310.

At block 312, available items of the associated samples are selected from the items based on a determination that the predicate is the attribute-based selection.

Items are identified among the selected items that satisfy the predicate at block 314. The identified items that satisfy the predicate may include one hundred or more identified items; however, a lesser number of identified items may also satisfy the predicate.

An adjusted weight is assigned to a particular item of the identified items at block 316 based on a weight of the particular item and a distribution of the associated samples. The adjusted weight may be a positive adjusted weight or a different type of weight.

In an example embodiment, adjusted weights are assigned as positive for all items included in the respective combination (other items are implicitly assigned adjusted weight of zero), are unbiased for all items in $U = \cup_{A \in S} A$, and have zero covariances.

In an example embodiment, $p(w, \tau) \equiv F_w(\tau)$ is the probability than an item with weight w obtains rank value that is smaller than $\tau$. SCS RC adjusted weights $a^{(SCS)}$ (i):

$$r_{k+1}(S) \leftarrow \min_{A \in S} r_{k+1}(A).$$

$$SCS_k(S,r) \leftarrow \{i \in \cup_{A \in S} s_k(A,r) | r(i) < r_{k+1}(S)\}$$

for all $i \in SCS_k(S, r)$, assigned the adjusted weight $a^{(SCS)}$ (i)$\leftarrow w(i)/(p(w(i), r_{k+1}(S)))$.

Once adjusted weights are computed, they may be applied to multiple predicates that share the same relevant set S and an applicable combination C.

At block 318, an estimate is generated based on the adjusted weight of the identified items of the associated samples that satisfy the predicate. The estimate may be generated by summing the adjusted weight of the identified items, or it may be calculated otherwise. The estimate may be an unbiased estimate or a biased estimate.

The estimate generated at block 318 for subpopulation weight may leverage additional samples contained in the LCS and excluded from a union-sketch.

The estimate may be provided at block 320 in response to receiving the query. The estimate may provide an estimated amount of items that satisfy the predicate of the query. The estimate may estimate the number of items in the union of applicable data sets that satisfy the predicate.

By way of example, all sets S relevant to the predicate may be identified, the samples of S may be retrieved, and the sample of the union may be computed. A property of the union-sample may include that for each item i included in the sample of the union, membership of the item i in the sets of S may be determined. Each membership in a set in S may be treated as an attribute of the items. A single-sketch subpopulation weight estimator may be applied to the union-sketch of S, treating membership-based conditions of the predicate as attribute-based conditions over the items in the union-sketch. For example, the set of items may include the inverted market-basket data set, and the query may be "the number of baskets of at most 10 items that contain beer or wine and cheese." The samples of beer, wine, and cheese may be isolated, and the union sketch may be computed. The union sample may include a random sample from the set of baskets that have beer, wine, or cheese. For each basket in the union, identification of whether it has or does not have each one of the three items may be made. The size of the basket may be an attribute. All baskets in the sample may be identified for which the predicate "has beer or has wine and has cheese and has size≤10" holds, and the distinct count may be estimated.

In an example embodiment, the LCS of S, denoted $LCS_k(S, r)$, includes all the information in the samples $s_k(A, r)$, $A \in S$.

Figure 4:
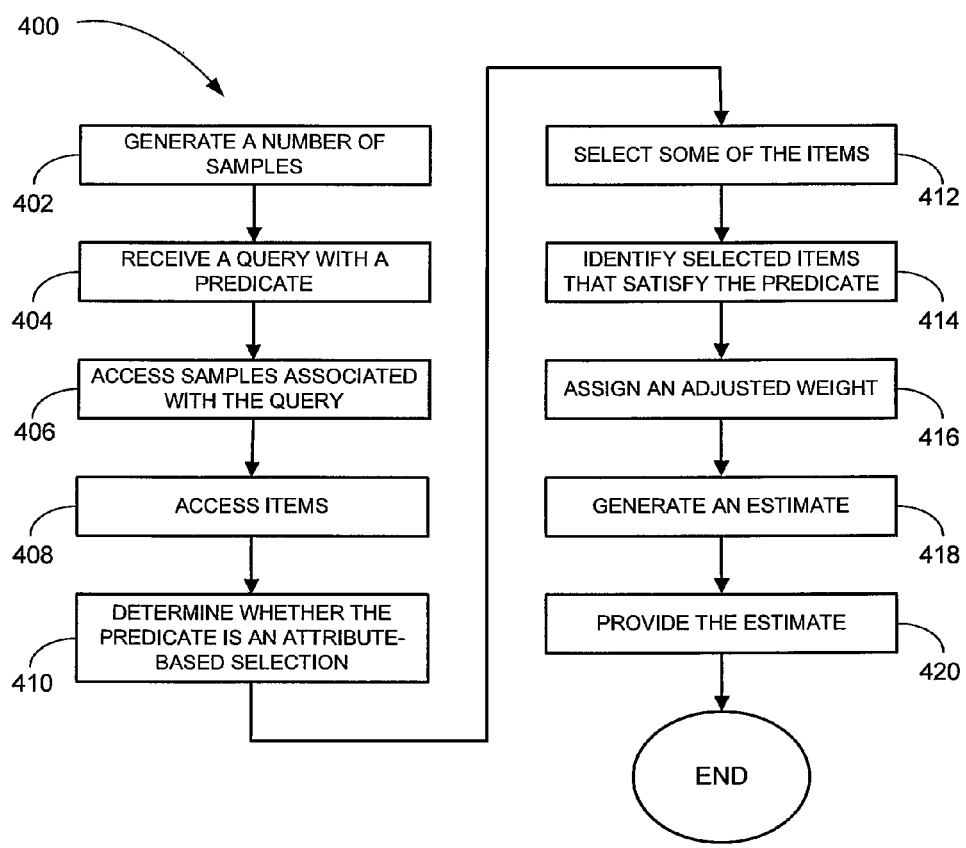

FIG. 4 illustrates a method 400 for estimate generation according to an example embodiment. The method 400 may be performed by the client machine 102 and/or the system server 106 of the system 100 (see FIG. 1), or otherwise performed. The method 400 is an example implementation using a short combination sketch (SCS).

A number of samples may be generated from a collection of items at block 402. The samples may be generated using a bottom-k function, a hash function, or may be generated otherwise.

A query with a predicate for a number of sets over a collection of items is received at block 404. Some of the sets may be overlapping where one or more of the items are included in multiple sets.

A number of samples associated with the query are accessed at block 406. The associated samples may be accessed by accessing a number of samples and identifying those samples associated with the query as the associated samples. The samples are accessed from multiple different databases or servers, from the same database or server, or may be otherwise accessed. In an example embodiment, a first associated sample is associated with a first particular data set, and a second associated sample is associated with a second particular data set.

A number of items of a particular associated sample of the associated samples are accessed from the collection of items at block 408.

A determination of whether the predicate is an attribute-based selection from a union of at least some sets of the plurality sets may be made at block 410.

At least some of the items of the associated samples are selected at block 412 based on item rankings. The selection of the items may be based on the item rankings and a determination that the predicate is not an attribute-based selection. Each available item may have its own item ranking.

At block 414, a number of items are identified among the selected items of the associated sample that satisfy the predicate. The identified items that satisfy the predicate may include one hundred or more identified items; however, a lesser number of identified items may also satisfy the predicate.

An adjusted weight is assigned to the identified items at block 416 based on a weight of the particular item, a distribution of the associated samples, and a result of a distribution function associated with the weight of the particular item. The adjusted weight may be a positive adjusted weight or a different type of weight.

An estimate is generated at block 418 based on the adjusted weight of the identified items of the associated samples that satisfy the predicate. The estimate may be generated by summing the adjusted weight of the identified items, or it may be calculated otherwise. The estimate may be an unbiased estimate or a biased estimate.

The estimate generated at block 418 for subpopulation weight may leverage additional samples contained in the SCS and excluded from a union-sketch.

The estimate may be provided in response to the receiving of the query at block 420.

In an example embodiment, the SCS of S, denoted $SCSk(S, r)$, contains the prefixes of the sketches $s_k(A, r)$ ($A \in S$) that include the items (e.g., all items) with rank values smaller than $rk+1(S) = \min_{A \in S} r_{k+1}(A)$. The SCS may also include the value $r_{k+1}(S)$. The SCS may contain between k and |S|k items. The size of the SCS may depend on the rank assignment.

The l≥k items in the SCS may be the l least-ranked items in the union $\cap A \in S$ A and $r_{k+1}(S) = r_{l+1}(\cup_{A \in S} A)$. Moreover, l may be maximal for which the l least-ranked items can be identified in the union from information available in the sketches of S. For WS sketches, the SCS may be viewed as the outcome of weighted sampling without replacement from the union of the sets S until k distinct samples are obtained from at least one of the sets in S.

In an example embodiment, for every item x in $SCS_k(S, r)$ and a set $A \in S$, $x \in A$ may be determined. $x \in A$ when x is in $s_k(A, r)$. The SCS may include the maximal set of items that are included in the union of the sketches that have this property.

Example applications in which the methods 300, 400 may be used for generating estimates include sensor nodes recording daily vehicle traffic in different locations in a city, a market-basket dataset, an "inverted" market-basket dataset, hyperlinked documents, and P2P networks.

One example application includes sensor nodes recording daily vehicle traffic in different locations in a city. Items are distinct vehicles (license plate numbers), and sets are location-date pairs (all vehicles observed at that location that date). Example queries with membership-based conditions: "number of distinct vehicles that were operating in Manhattan on election day, 2008" (size of the union of all Manhattan locations in election day) or "number of distinct vehicles operated in Tribeca on both Sunday and Monday on election week" (size of intersection of the union of locations in Tribeca neighborhood in Monday and Tuesday); "number of vehicles that crossed both the Hudson and the East River on Independence day 2008" (size of intersection of the union of bridges/tunnels across the Hudson and bridges/tunnels across the East River) etc. Queries may be restricted to particular classes of vehicles (e.g., taxi cabs or heavy trucks) by adding attribute-based conditions. Such queries may be used for planning purposes.

Another example application includes a market-basket dataset. Items are goods, each with an associated marketing cost (these are the weights). Each customer (basket) defines a set that is the set of goods purchased. Example queries are "the total marketing cost of baby products purchased by male customers from Union county." This predicate has attribute-based conditions (e.g., product type) and membership-based conditions (e.g., specification of the customer segment as a union of sets).

Another example application includes an "Inverted" market-basket dataset. Items are baskets (e.g., customers), and sets are goods (e.g., all baskets containing that particular good). A query that asks "what is the likelihood that a certain item is purchased given that another item is purchased" (this is an "association rule") can be expressed using a predicate with membership-based conditions. If A is the set of customers purchasing, say beer, and B is the set of customers purchasing diapers, then the selectivity of A∩B with respect to B is the likelihood that a person purchases beer given that the same person purchased diapers. This query can be narrowed down to a particular customer segment (e.g., by zip code or gender) if attribute-based condition is added to the predicate.

Another example application includes hyperlinked documents. Sets and items are documents, where the set of document A includes all documents with hyperlinks to document A. Documents may be weighted by access data or page rank. Example queries are "the total weight of documents referencing at least 5 out of the 10 documents in Q." This predicate has membership-based conditions.

Yet another example application includes a P2P network. Items are files, and sets are all neighborhoods of all peers (sets of files shared by peers in that neighborhood). Example queries are "the weight of common items stored by 5-hop neighbors of peer A and peer B," or "number of distinct files in a particular subject shared by 3-hop neighbors of A." Such queries can be used to keep the search focused on peers that contains many items in a particular topic or peers that are more similar to the querying peer.

Figure 5:
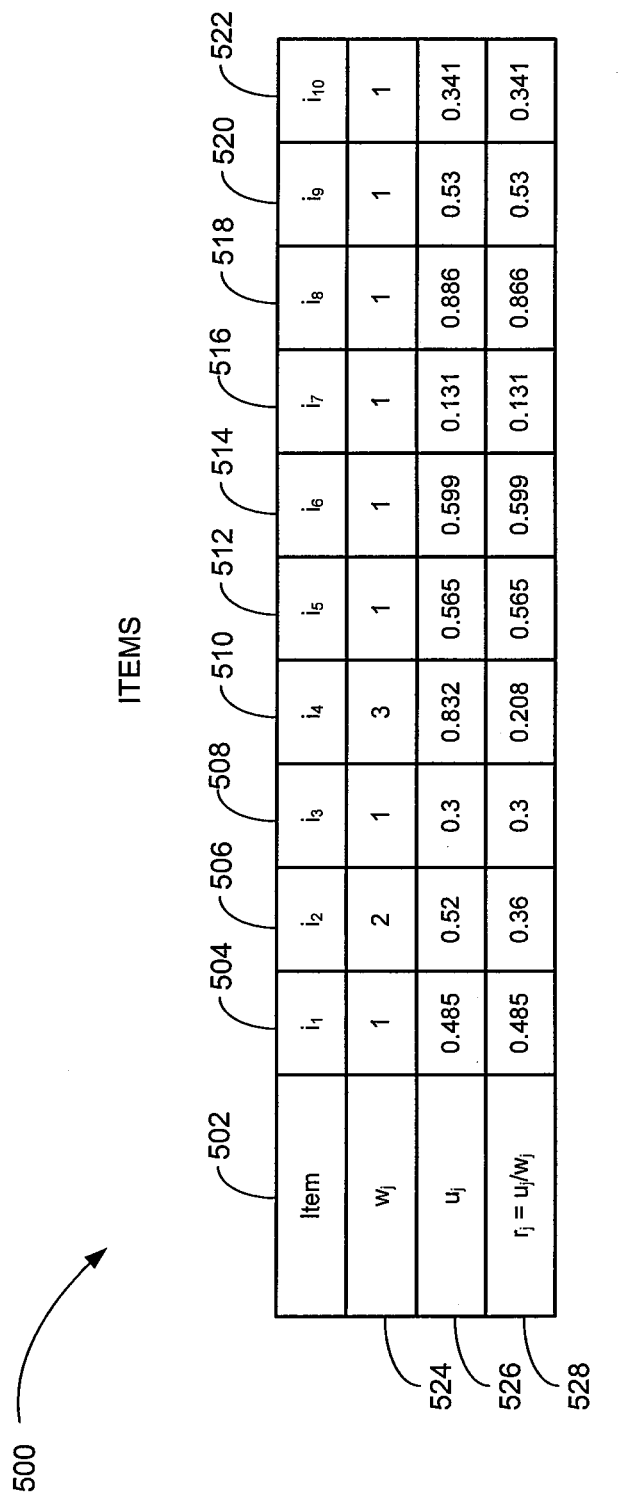
FIG. 5 is a block diagram of an example chart showing a set of items, according to an example embodiment.

FIG. 5 illustrates an example chart 500 showing a set of items 502, according to an example embodiment. The set of items 502 is shown by way of example as a ground set of ten items 504-522. However, a differing number of items may be used. The items 504-522 are associated with a respective weight 524 and a rank 526 from which an adjusted weight 528 is calculated.

Figure 6:
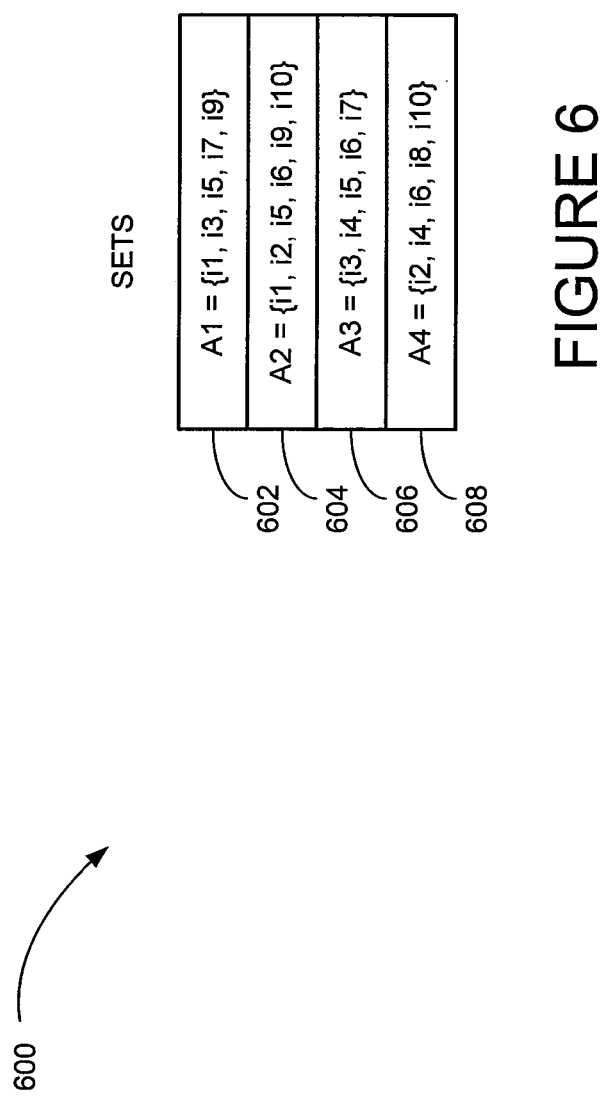
FIG. 6 is a block diagram of example subsets for the items of FIG. 5, according to an example embodiment.

FIG. 6 illustrates example subsets 600 for the set of items 502 (see FIG. 5), according to an example embodiment. The subsets 600 include a subset 602 that includes $i_1$, $i_3$, $i_5$, $i_7$, and $i_9$; a subset 604 that includes $i_1$, $i_2$, $i_5$, $i_6$, $i_9$, $i_{10}$; a subset 606 that includes $i_3$, $i_4$, $i_5$, $i_6$, and $i_7$; and a subset 608 that includes $i_2$, $i_4$, $i_6$, $i_8$, and $i_{10}$.

FIG. 7 illustrates a chart 700 showing the set of items 502 (see FIG. 5) sorted by increasing ranks, according to an example embodiment. The chart 700 shows the set of items 502 sorted by ranks as the sorted set of items 704-722. The chart 700 also shows set membership of the sorted items 704-722 in the sets 724-730.

Figure 8:
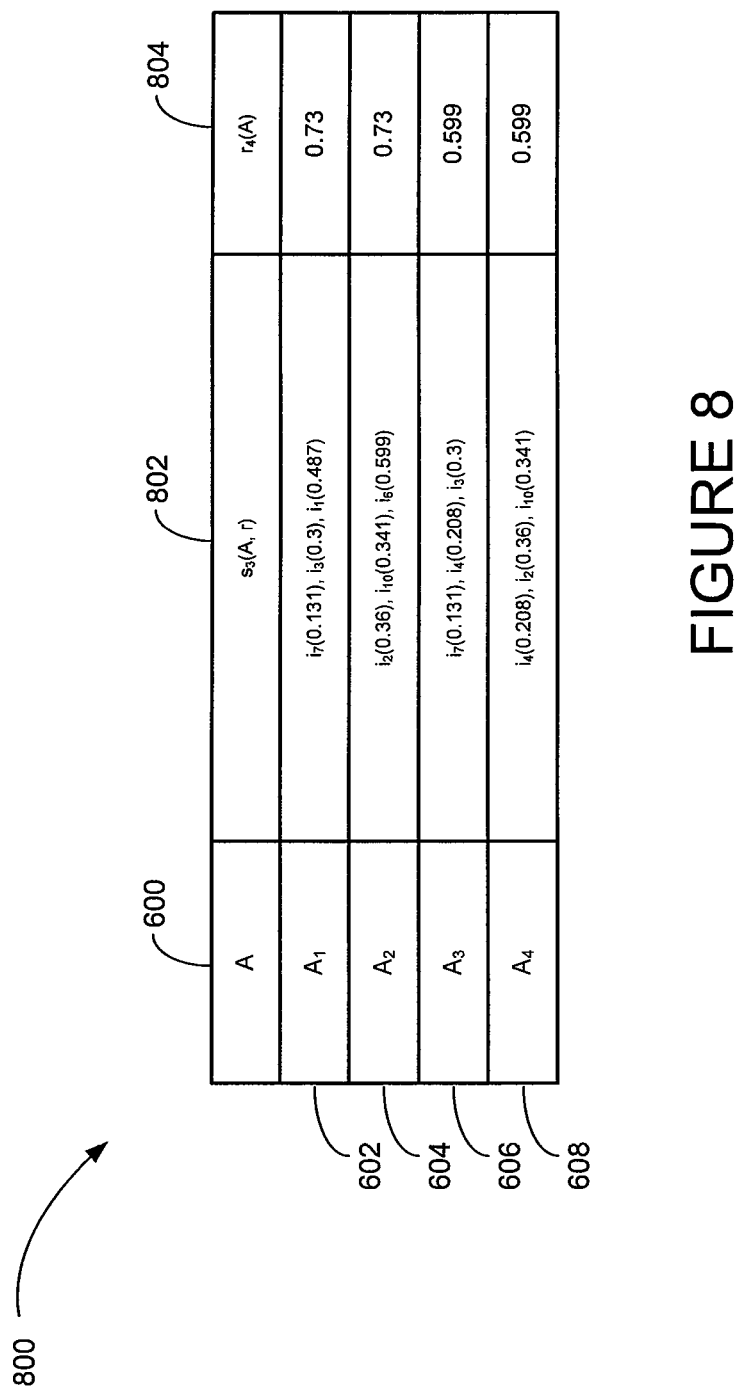
FIG. 8 is a block diagram of a chart of bottom-3 sketches of the subsets of FIG. 6, according to an example embodiment.

FIG. 8 illustrates a chart 800 of bottom-3 sketches of the subsets 600 (see FIG. 6.), according to an example embodiment. The chart 800 shows the bottom-3 sketches 802 and the fourth smallest rank value 804 for the subsets 600. The set 602 is shown to have the bottom-3 sketches of $i_7(0.131)$, $i_3(0.3)$, $i_1(0.487)$ and the fourth smallest rank of 0.73. The set 604 is shown to have the bottom-3 sketches of $i_2(0.36)$, $i_{10}(0.341)$, $i_6(0.599)$ and the fourth smallest rank of 0.73. The set 606 is shown to have the bottom-3 sketches of $i_7(0.131)$, $i_4(0.208)$, $i_3(0.3)$ and the fourth smallest rank of 0.599. The set 608 is shown to have the bottom-3 sketches of $i_4(0.208)$, $i_2(0.36)$, $i_{10}(0.341)$ and the fourth smallest rank of 0.599.

FIG. 9 is a block diagram of a comparison chart 900, according to an example embodiment. The comparison chart 900 compares for selected subsets 902 and combination types 904, content 906 and a number of associated items 908.

Selected subsets 910 for $A_1$, $A_2$ include a union sketch of the selected subsets 910 as the combination type 904. The content includes $i_7(0.131)$, $i_2(0.36)$, $i_3(0.3)$, and the number of items 908 is three.

Selected subsets 912 for $A_1$, $A_2$ include a SCS of the selected subsets 912 as the combination type 904. The content includes $i_7(0.131)$, $i_2(0.36)$, $i_3(0.3)$, $i_{10}(0.341)$, $i_1(0.487)$, $i_6(0.599)$, and the number of items 908 is six.

Selected subsets 914 for $A_1$, $A_2$ include a LCS of the selected subsets 914 as the combination type 904. The content includes $i_7(0.131)$, $i_2(0.36)$, $i_3(0.3)$, $i_{10}(0.341)$, $i_1(0.487)$, $i_6(0.599)$, and the number of items 908 is six.

Selected subsets 916 for $A_1$, $A_2$, $A_3$, $A_4$ include a union sketch of the selected subsets 916 as the combination type 904. The content includes $i_7(0.131)$, $i_4(0.208)$, $i_2(0.36)$, and the number of items 908 is three.

Selected subsets 918 for $A_1$, $A_2$, $A_3$, $A_4$ include a SCS of the selected subsets 918 as the combination type 904. The content includes $i_7(0.131)$, $i_4(0.208)$, $i_2(0.36)$, $i_3(0.3)$, $i_{10}(0.341)$, $i_1(0.487)$, and the number of items 908 is six.

Selected subsets 920 for $A_1$, $A_2$, $A_3$, $A_4$ include a LCS of the selected subsets 920 as the combination type 904. The content includes $i_7(0.131)$, $i_4(0.208)$, $i_2(0.36)$, $i_3(0.3)$, $i_{10}(0.341)$, $i_1(0.487)$, $i_6(0.599)$, and the number of items 908 is seven.

Figure 10:
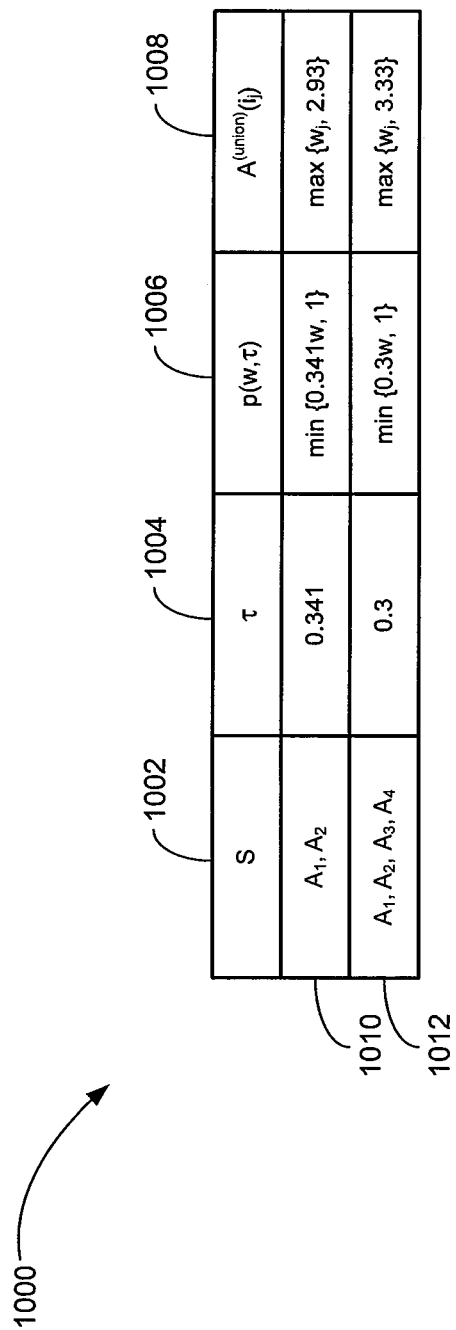

FIG. 10 is a block diagram of a chart 1000 of an adjusted weight of a union sketch, according to an example embodiment. The subsets 1002 are shown to have a τ 1004 based on $r_4(\cup_{A \in S} A)$ and a $p(w_j, \tau)$ 1006 used to calculate $a^{(union)}(i_j) = w_j / p(w_j, \tau)$ 1008. A subset 1010 has a 0.341 value for the τ 1004, a min $\{0.341w, 1\}$ entry for the $p(w_j, \tau)$ 1006, and a max $\{w_j, 2.93\}$ entry for the $a^{(union)}(i_j) = w_j / p(w_j, \tau)$ 1008. A subset 1012 has a 0.3 value for the τ 1004, a min $\{0.3w, 1\}$ entry for the $p(w_j, \tau)$ 1006, and a max $\{w_j, 3.33\}$ entry for the $a^{(union)}(i_j) = w_j / p(w_j, \tau)$ 1008.

Figure 11:
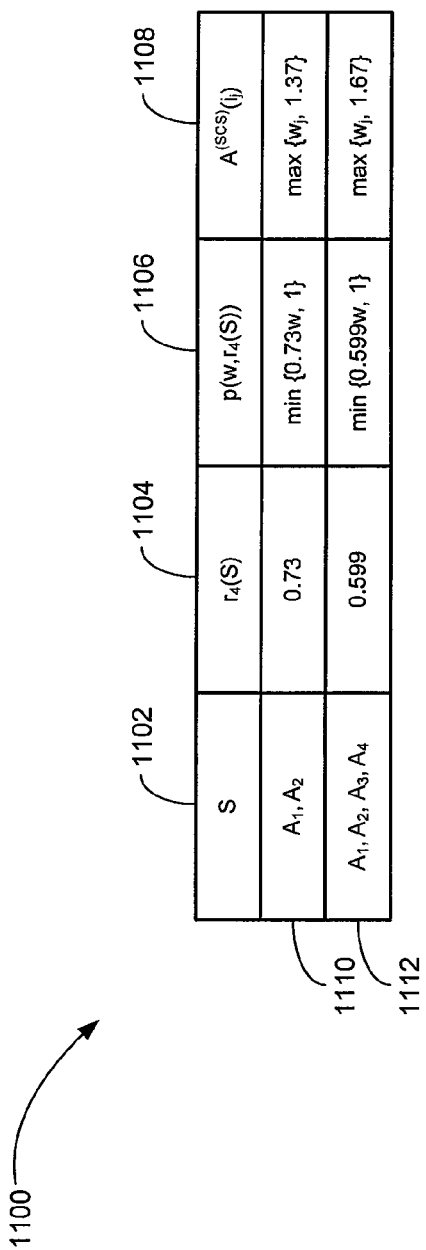

FIG. 11 is a block diagram of a chart 1100 of an adjusted weight computation of a SCS, according to an example embodiment. The subsets 1102 have a τ based on a $r_4(S)$ 1104, a $p(w, r_4(S))$ 1106 and a $a^{(SCS)}(i_j) = w_j / p(w_j, \tau)$ 1108. A subset 1110 has a 0.73 value for the $r_4(S)$ 1104, a min $\{0.73w, 1\}$ entry for the $p(w, r_4(S))$ 1106, and a max $\{wj, 1.37\}$ entry for the $a^{(SCS)}(i_j) = w_j / p(w_j, \tau)$ 1108. A subset 1112 has a 0.599 value for the $r_4(S)$ 1104, a min $\{0.599w, 1\}$ entry for the $p(w, r_4(S))$ 1106, and a max $\{wj, 1.67\}$ entry for the $a^{(SCS)}(i_j) = w_j / p(w_j, \tau)$ 1108.

FIG. 12 is a block diagram of a chart 1200 of an adjusted weight computation of a LCS, according to an example embodiment. The sets are sorted by increasing $r_4$ as follows: $A_3, A_4, A_1$ and $A_2$. The items 1204-1216 of a row 1202 are each shown as having values for $f(S, r, i_j)$ 1218, $\tau(S, r, i_j)$ 1220, and $A^{(LCS)}(i_j)$ 1222. The $f(S, r, i_j)$ 1218 value for the items 1204-1216 is 1, 4, 2, 1, 2, 1, and 2. The $\tau(S, r, i_j)$ 1220 value for the items 1204-1216 is 0.73, 0.599, 0.73, 0.73, 0.73, 0.73, and 0.73. The $A^{(LCS)}(i_j)$ 1222 value for the items 1204-1216 is 1.37, 3, 2, 1.37, 1.37, 1.37, and 1.37.

Figure 13:
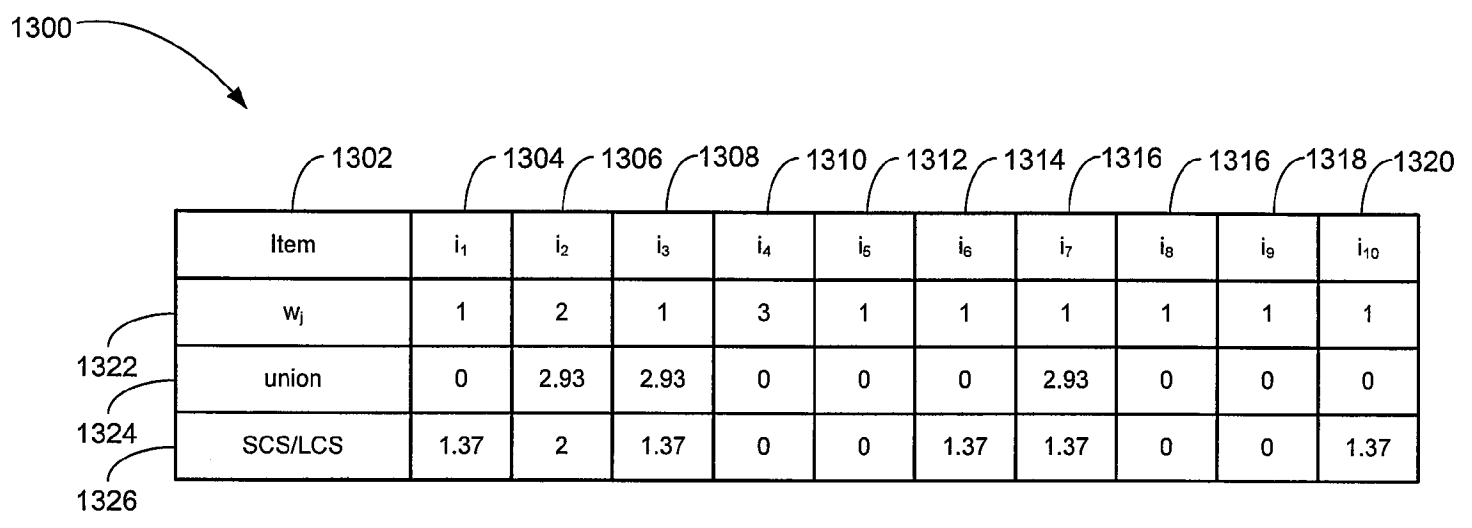

FIG. 13 is a block diagram of a chart 1300 of adjusted weights for subsets $A_1, A_2$, according to an example embodiment. The chart 1300 includes an item row 1302 for items 1304-1320 and additional rows with associated values for a $w_j$ 1322, a union 1324, and a SCS/LCS 1326. The value of the $w_j$ 1322 for the items 1304-1320 is 1, 2, 1, 3, 1, 1, 1, 1, 1, and 1. The value of the union 1324 for the items 1304-1320 is 0, 2.93, 2.93, 0, 0, 0, 2.93, 0, 0, and 0. The value of the SCS/LCS 1326 for the items 1304-1320 is 1.37, 2, 1.37, 0, 0, 1.37, 1.37, 0, 0, and 1.37.

Figure 14:
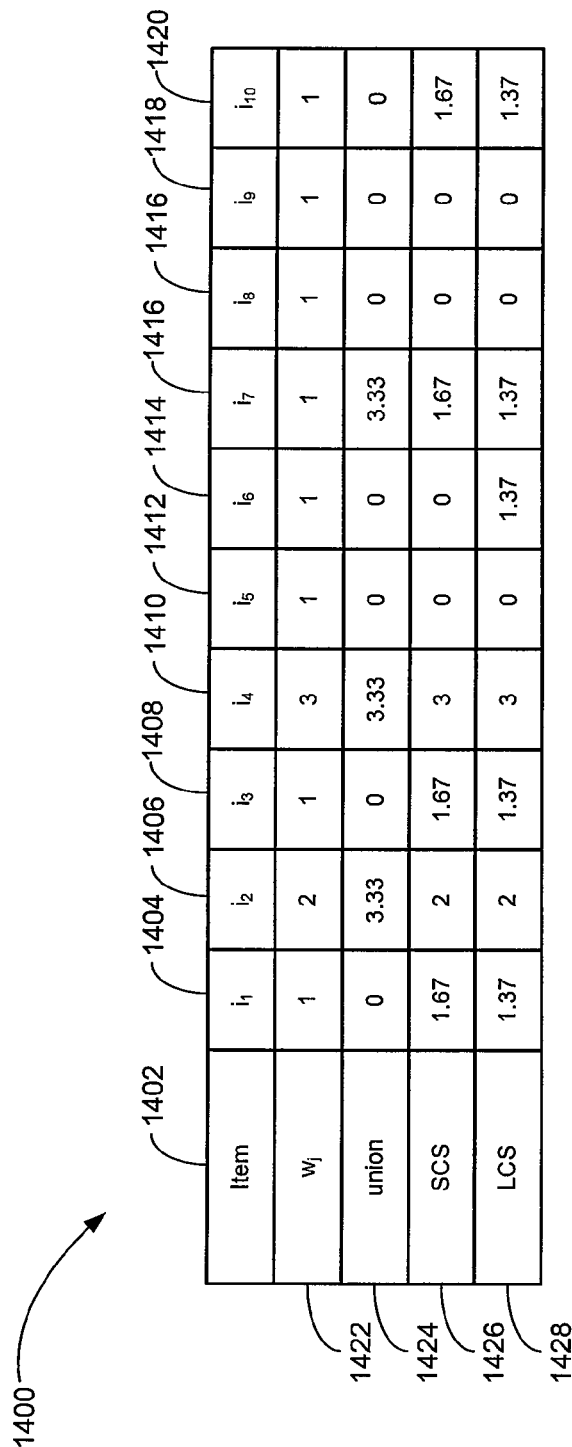

FIG. 14 is a block diagram of a chart 1400 of adjusted weights for subsets $A_1, A_2, A_3, A_4$ according to an example embodiment. The chart 1400 includes an item row 1402 for items 1404-1420 and additional rows with associated values for a $w_j$ 1422, a union 1424, a SCS 1426, and a LCS 1428. The value of the $w_j$ 1422 for the items 1404-1420 is 1, 2, 1, 3, 1, 1, 1, 1, 1, and 1. The value of the union 1424 for the items 1404-1420 is 0, 3.33, 0, 3.33, 0, 0, 3.33, 0, 0, and 0. The value of the SCS 1426 for the items 1404-1420 is 1.67, 2, 1.67, 3, 0, 0, 1.67, 0, 0, and 1.67. The value of the LCS 1428 for the items 1404-1420 is 1.37, 2, 1.37, 3, 0, 1.37, 1.37, 0, 0 and 1.37.

FIG. 15 illustrates a chart 1500 with example predicates based on the computed adjusted weight computations as shown in FIGS. 10-14, according to an example embodiment.

The chart 1500 includes a condition column 1502, a relevant subsets combination 1504, an items column 1506, a weight column 1508, a RC union column 1510, a RC SCS column 1512, a RC LCS column 1514, and a selection column 1516.

The condition column 1502 shows example conditions for predicates 1518-1524. The conditions include "$i_j \in \cup_{i \in [2]} A_i$ (j<8 v j≥4)", "$i_j \in \cap_{i \in [2]} A_{i \cdot (j<} 8$ v j≥4)", "$i_j \in$ at least two out of $A_1, \ldots, A_4$)", and "$i_j \in \cup_{i \in [4]} A_i$ j is odd" respectively.

The relevant subsets combination 1504 shows the relevant sets for the corresponding predicates 1518-1524. The relevant subsets include "$A_1, A_2$", "$A_1, A_2$", "$A_1, A_2 A_3, A_4$" and "$A_1, A_2 A_3, A_4$" respectively.

The items column 1506 shows the items that satisfy the predicates 1518-1524. The items include "$i_5, i_6, i_7$", "$i_5$", "$i_1, \ldots i_7, i_8, i_9$", and "$i_1, i_3, i_5, i_7, i_9$" respectively. The weight column 1508 shows the weight of the items in the items column for the predicates 1518-1524. The weights include 3, 1, 12, and 5 respectively.

The RC union column 1510 indicates the estimate based on the union sketch computed in FIGS. 13 and 14. For the predicates 1518-1524, the estimates are 2.93, 0, 10, and 3.3 respectively. The RC SCS column 1512 indicates the estimate based on the SCS sketch computed in FIGS. 13 and 14. For the predicates 1518-1524, the estimates are 2.74, 1.37, 11.68, and 5 respectively. The RC LCS column 1514 indicates the estimate based on the LCS sketch computed in FIGS. 13 and 14. For the predicates 1518-1524, the estimates are 2.74, -.-, and 4.1 respectively.

The selection column 1516 may indicate a selection of a combination for the estimate. For the predicates 1518-1524, the selections are $LCS_3, SCS_3, SCS_3$ and $LCS_3$ respectively.

In an example embodiment, a benefit of $SCS_k$ and $LCS_k$ over the $size_k$ union sketch was equivalent to effectively using a larger sketch size. That is, if the combination included l≥k items, the estimation error decreased by a factor of pl/k.

Figure 16:
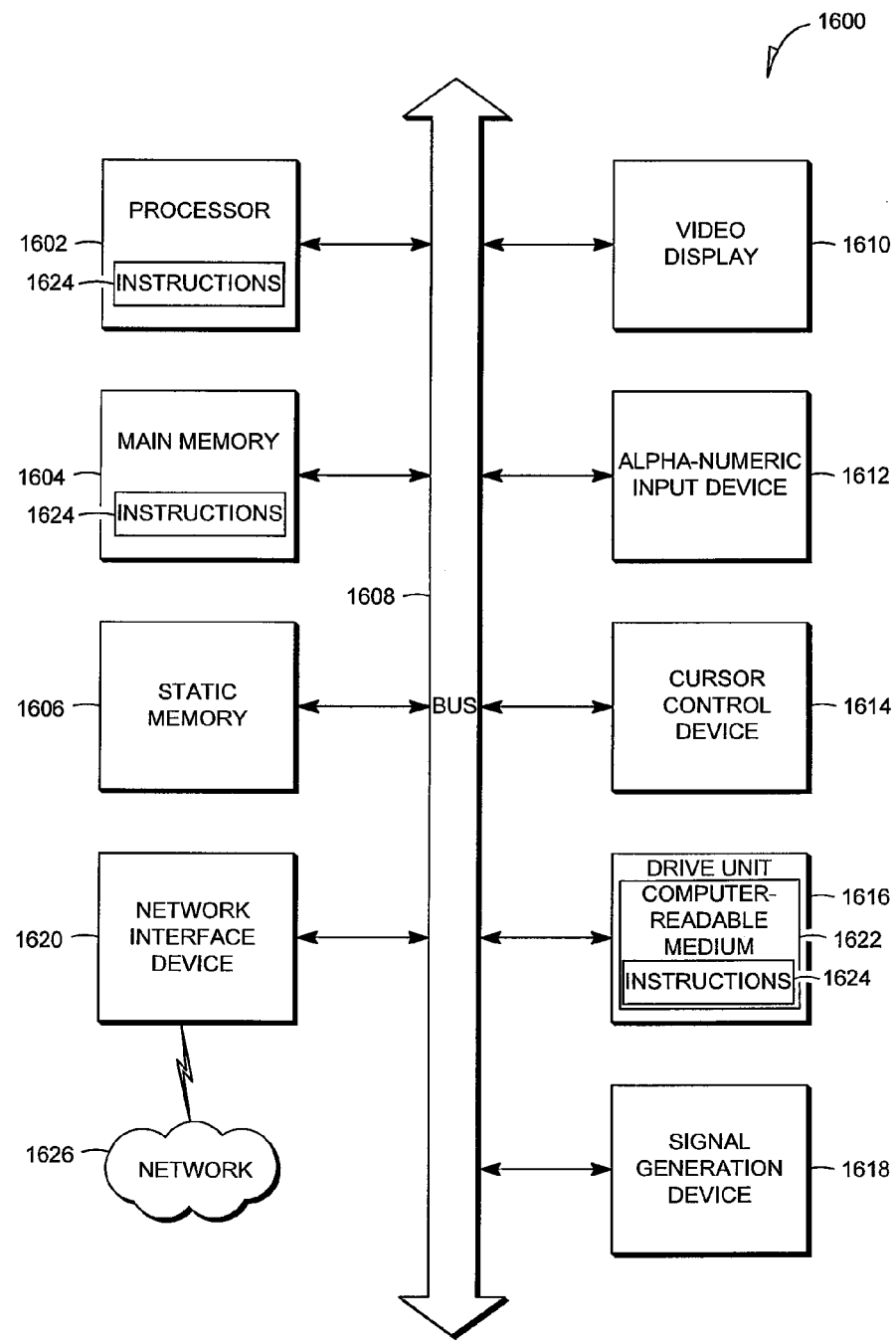
FIG. 16 is a block diagram of a machine in the example form of a computer system within which a set of instructions for causing the machine to perform any one or more of the methodologies discussed herein may be executed.

FIG. 16 shows a block diagram of a machine in the example form of a computer system 1600 within which a set of instructions may be executed causing the machine to perform any one or more of the methods, processes, operations, or methodologies discussed herein. The system server 106 of FIG. 1 may operate on one or more computer systems 1600. The client machine 102 of FIG. 1 may include the functionality of the one or more computer systems 1600.

In an example embodiment, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, a kiosk, a point of sale (POS) device, a cash register, an Automated Teller Machine (ATM), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes at least one processor 1602 (e.g., a central processing unit (CPU) a graphics processing unit (GPU) or both), a main memory 1604, and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard), a cursor control device 1614 (e.g., a mouse), a drive unit 1616, a signal generation device 1618 (e.g., a speaker) and a network interface device 1620.

The drive unit 1616 includes a machine-readable medium 1622 on which is stored one or more sets of instructions (e.g., software 1624) embodying any one or more of the methodologies or functions described herein. The software 1624 may also reside, completely or at least partially, within the main memory 1604 and/or within the processor 1602 during execution thereof by the computer system 1600, the main memory 1604 and the processor 1602 also constituting machine-readable media.

The software 1624 may further be transmitted or received over a network 1626 via the network interface device 1620.

While the machine-readable medium 1622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the inventive subject matter. The term "machine-readable medium" shall accordingly be taken to include, but not be limited to, solid-state memories, optical media, and magnetic media.

Certain systems, apparatus, applications or processes are described herein as including a number of modules. A module may be a unit of distinct functionality that may be presented in software, hardware, or combinations thereof. The modules may be regarded as being communicatively coupled. The modules may present a machine-readable medium carrying instructions which when executed by one or more processors provide the indicated functionality.

In an example embodiment, a query with a predicate may be received for a plurality of sets over a collection of items. A plurality of associated samples associated with the query may be accessed. A plurality of items of a particular associated sample of the plurality of associated samples may be accessed from the collection of items. A determination of whether the predicate is an attribute-based selection from a union of at least some sets of the plurality sets may be made. A plurality of available items of the particular associated sample may be selected from the plurality of items based on the determining that the predicate is the attribute-based selection. A plurality of identified items may be identified among the plurality of available items in the particular associated sample that satisfy the predicate. An adjusted weight may be assigned to a particular item of the plurality of identified items based on a weight of the particular item and a distribution of the plurality of associated samples. An estimate may be generated based on the adjusted weight of the plurality of identified items of the plurality of associated samples that satisfy the predicate.

In an example embodiment, a query with a predicate may be received for a plurality of sets over a collection of items. A plurality of associated samples associated with the query may be accessed. A plurality of items of a particular associated sample of the plurality of associated samples may be accessed from the collection of items. At least some of the plurality of items of the particular associated sample may be selected as the plurality of available items based on a plurality of item rankings. A particular item ranking of the plurality of item rankings may be associated with a particular available item of the plurality of available items. A plurality of identified items may be identified among the plurality of items in the associated sample that satisfy the predicate. An adjusted weight may be assigned to a particular item of the plurality of identified items based on a weight of the particular item, a distribution of the plurality of associated samples, and a result of a distribution function associated with the weight of the particular item. An estimate may be generated based on the adjusted weight of the plurality of identified items of the plurality of associated samples that satisfy the predicate.

In an example embodiment, a query with a predicate may be received. A plurality of associated samples associated with the query may be accessed. A plurality of items of a particular associated sample of the plurality of associated samples may be accessed. A plurality of identified items may be identified among the plurality of items in the associated sample that satisfy the predicate. An adjusted weight may be assigned to a particular item of the plurality of identified items based on an adjustment criterion. An estimator may be generated based on the adjusted weight of the plurality of identified items of the plurality of associated samples that satisfy the predicate.

Thus, methods and systems for estimate derivation have been described. Although embodiments of the present invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

It should be noted that the methods described herein do not have to be executed in the order described, or in any particular order. Moreover, various activities described with respect to the methods identified herein can be executed in serial or parallel fashion.

It will be understood that although "End" blocks are shown in the flowcharts, the methods may be performed continuously.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate embodiment.

What is claimed is:

1. A method comprising:

using one or more processors to execute instructions retained in one or more machine-readable media to perform operations comprising:

accessing a plurality of bottom-k sketches summarizing a plurality of sets (denoted herein by S) over a collection of items, the plurality of sets (S) associated with a query having a predicate for the plurality of sets over the collection of items, a first one of the bottom-k sketches (denoted herein by $s_k(A,r)$) for a first one of the sets (denoted herein by A, which represents a set in S) including pairs of ranks and weights for a subset of the items, the ranks being determined according to a rank assignment (denoted herein by r), the subset containing a first number (denoted herein by k) of the items having smallest ranks among the items included in the first one of the sets (A), the first one of the bottom-k sketches ($s_k(A,r)$) also including a next largest rank (denoted herein by $r_{k+1}(A)$) corresponding to a smallest remaining rank among the remaining items included in the first one of the sets (A) but not included in the first one of the bottom-k sketches ($s_k(A,r)$);

selecting a plurality of available items of a combination of the plurality of bottom-k sketches based on determining that the predicate is an attribute-based selection, the combination (denoted herein by $(SCS_k(S,r))$ of the plurality of bottom-k sketches ($s_k(A,r)$ for A∈S) containing more than the first number (k) of the items contained in each one of the plurality of bottom-k sketches ($s_k(A,r)$ for A∈S) and including any item from the plurality of bottom-k sketches ($s_k(A,r)$ for A∈S) having a respective rank less than a limiting rank (denoted herein by $r_{k+1}$(S)), the limiting rank ($r_{k+1}$(S)) being a minimum of a plurality of next largest ranks ($r_{k+1}(A)$ for A∈S) corresponding respectively to the plurality of bottom-k sketches ($s_k(A,r)$ for A∈S);

identifying a plurality of identified items among the plurality of available items, the plurality of identified items satisfying the predicate;

assigning a first adjusted weight to a first item of the plurality of identified items based on a weight of the first item and a distribution associated with the plurality of bottom-k sketches; and generating an estimate based on the first adjusted weight assigned to the first item and adjusted weights assigned to other identified items from the combination of the plurality of bottom-k sketches and that satisfy the predicate.

2. The method of claim 1, further comprising:
providing the estimate in response to the query.

3. The method of claim 1, wherein the accessing of the plurality of bottom-k sketches comprises:
accessing a first bottom-k sketch from a first server; and
accessing a second bottom-k sketch from a second server.

4. The method of claim 1, further comprising:
generating the plurality of bottom-k sketches from the collection of items.

5. The method of claim 1, wherein items in the first set are randomly assigned ranks using distributions based on weights assigned to the items.

6. A method comprising:
using one or more processors to execute instructions retained in one or more machine-readable media to perform operations comprising:
accessing a plurality of bottom-k sketches summarizing a plurality of sets (denoted herein by S) over a collection of items, the plurality of sets (S) associated with a query having a predicate for the plurality of sets over the collection of items, a first one of the bottom-k sketches (denoted herein by $s_k(A,r)$) for a first one of the sets (denoted herein by A, which represents a set in S) including pairs of ranks and weights for a subset of the items, the ranks being determined according to a rank assignment (denoted herein by r), the subset containing a first number (denoted herein by k) of the items having smallest ranks among the items included in the first one of the sets (A), the first one of the bottom-k sketches ($s_k(A,r)$) also including a next largest rank (denoted herein by $r_{k+1}(A)$) corresponding to a smallest remaining rank among the remaining items included in the first one of the sets (A) but not included in the first one of the bottom-k sketches ($s_k(A,r)$);
selecting at least some of a plurality of items of the first or a second bottom-k sketch based on a plurality of item rankings, a first item ranking of the plurality of item rankings being associated with a first item of the plurality of items;
identifying a plurality of identified items among the plurality of items, the plurality of identified items satisfying the predicate;
assigning a first adjusted weight to a first item of the plurality of identified items based on a weight of the first item, a distribution associated with the plurality of bottom-k sketches, and a result of a distribution function associated with the weight of the first item; and
generating an estimate based on the first adjusted weight assigned to the first item and adjusted weights assigned to other identified items from a combination of the plurality of bottom-k sketches that satisfy the predicate, the combination (denoted herein by $(SCS_k(S,r))$ containing more than the first number (k) of the items contained in each one of the plurality of bottom-k sketches ($s_k(A,r)$ for A∈S) and including any item from the plurality of bottom-k sketches ($s_k(A,r)$ for A∈S) having a respective rank less than a limiting rank (denoted herein by $r_{k+1}(S)$), the limiting rank ($r_{k+1}(S)$) being a minimum of a plurality of next largest ranks ($r_{k+1}(A)$ for A∈S) corresponding respectively to the plurality of bottom-k sketches ($s_k(A,r)$ for A∈S).

7. The method of claim 6, further comprising:
determining whether the predicate is an attribute-based selection from a union of at least some sets of the plurality of sets, wherein selecting the at least some of the plurality of items of the first or the second bottom-k sketch is further based on determining that the predicate is not the attribute-based selection.

8. The method of claim 6, further comprising:
providing the estimate in response to the query.

9. The method of claim 6, wherein the accessing of the plurality of bottom-k sketches comprises:
accessing a first bottom-k sketch from a first server; and
accessing a second bottom-k sketch from a second server.

10. The method of claim 6, further comprising:
generating the plurality of bottom-k sketches from a group of items, the group of items being arranged in the plurality of data sets.

11. The method of claim 6, wherein items in the first set are randomly assigned ranks using distributions based on weights assigned to the items.

12. The method of claim 11, wherein the first bottom-k sketch for the first set further includes a rank value corresponding to the item in the first set having a next highest rank above the ranks included in the pairs of ranks and weights for the subset of the items.

13. A tangible machine-readable storage medium comprising instructions, which when executed by one or more processors, cause the one or more processors to perform operations comprising:
accessing a plurality of bottom-k sketches summarizing a plurality of sets over a collection of items, the plurality of sets (denoted herein by S) associated with a query having a predicate for the plurality of sets (S) over the collection of items, a first one of the bottom-k sketches (denoted herein by $s_k(A,r)$) for a first one of the sets (denoted herein by A, which represents a set in S) including pairs of ranks and weights for a subset of the items, the ranks being determined according to a rank assignment (denoted herein by r), the subset containing a first number (denoted herein by k) of the items having smallest ranks among the items included in the first one of the sets (A), the first one of the bottom-k sketches ($s_k(A,r)$) also including a next largest rank (denoted herein by $r_{k+1}(A)$) corresponding to a smallest remaining rank among the remaining items included in the first one of the sets (A) but not included in the first one of the bottom-k sketches ($s_k(A,r)$);
selecting a plurality of available items of a combination of the plurality of bottom-k sketches based on determining that the predicate is an attribute-based selection, the combination (denoted herein by $(SCS_k(S,r))$ of the plurality of bottom-k sketches ($s_k(A,r)$ for A∈S) containing more than the first number (k) of the items and including any item from the bottom-k sketches ($s_k(A,r)$ for A∈S) having a respective rank less than a limiting rank (denoted herein by $r_{k+1}(S)$), the limiting rank ($r_{k+1}(S)$) being a minimum of a plurality of next largest ranks ($r_{k+1}(A)$ for A∈S) corresponding respectively to the plurality of bottom-k sketches ($s_k(A,r)$ for A∈S);
identifying a plurality of identified items among the plurality of available items, the plurality of identified items satisfying the predicate;

assigning a first adjusted weight to a first item of the plurality of identified items based on a weight of the first item and a distribution associated with the plurality of bottom-k sketches; and generating an estimate based on the first adjusted weight assigned to the first item and adjusted weights assigned to other identified items from the combination of the plurality of bottom-k sketches and that satisfy the predicate.

14. The machine-readable storage medium of claim 13 further comprising second instructions, which when executed, cause the one or more processors to perform further operations comprising:

generating the plurality of bottom-k sketches from the collection of items.

15. A tangible machine-readable storage medium comprising instructions, which when executed by one or more processors, cause the one or more processors to perform operations comprising:

accessing a plurality of bottom-k sketches summarizing a plurality of sets (denoted herein by S) over a collection of items, the plurality of sets (S) associated with a query having a predicate for the plurality of sets over the collection of items, a first one of the bottom-k sketches (denoted herein by $s_k(A,r)$) for a first one of the sets (denoted herein by A, which represents a set in S) including pairs of ranks and weights for a subset of the items, the ranks being determined according to a rank assignment (denoted herein by r), the subset containing a first number (denoted herein by k) of the items having smallest ranks among the items included in the first one of the sets (A), the first one of the bottom-k sketches ($s_k(A,r)$) also including a next largest rank (denoted herein by $r_{k+1}(A)$) corresponding to a smallest remaining rank among the remaining items included in the first one of the sets (A) but not included in the first one of the bottom-k sketches ($s_k(A,r)$);

selecting at least some of a plurality of items of the first or a second bottom-k sketch based on a plurality of item rankings, a first item ranking of the plurality of item rankings being associated with a first item of the plurality of items;

identifying a plurality of identified items among the plurality of items, the plurality of identified items satisfying the predicate;

assigning a first adjusted weight to a first item of the plurality of identified items based on a weight of the first item, a distribution associated with the plurality of bottom-k sketches, and a result of a distribution function associated with the weight of the first item; and generating an estimate based on the first adjusted weight assigned to the first item and adjusted weights assigned to other identified items from a combination of the plurality of bottom-k sketches that satisfy the predicate, the combination (denoted herein by ($SCS_k(S,r)$)) containing more than the first number (k) of the items contained in each one of the plurality of bottom-k sketches ($s_k(A,r)$ for A∈S) and including any item from the plurality of bottom-k sketches ($s_k(A,r)$ for A∈S), the limiting rank ($r_{k+1}(S)$) being a minimum of a plurality of next largest the plurality of bottom-k sketches ($s_k(A,r)$ for A∈S).

16. The machine-readable storage medium of claim 15 further comprising second instructions, which when executed, cause the one or more processors to perform further operations comprising:

determining whether the predicate is an attribute-based selection from a union of at least some sets of the plurality of sets, wherein selection of the at least some of the plurality of items of the first or the second bottom-k sketch is further based on a determination that the predicate is not the attribute-based selection.

17. A system comprising:

a programmable processor to implement a plurality of modules comprising:

a sample access module to access a plurality of bottom-k sketches summarizing a plurality of sets (denoted herein by S) over a collection of items, the plurality of sets (S) associated with a query having a predicate for the plurality of sets over the collection of items, a first one of the bottom-k sketches (denoted herein by $s_k(A,r)$) for a first one of the sets (denoted herein by A, which represents a set in S) including pairs of ranks and weights for a subset of the items, the ranks being determined according to a rank assignment (denoted herein by r), the subset containing a first number (denoted herein by k) of the items having smallest ranks among the items included in the first one of the sets (A), the first one of the bottom-k sketches ($s_k(A,r)$) also including a next largest rank (denoted herein by $r_{k+1}(A)$) corresponding to a smallest remaining rank among the remaining items included in the first one of the sets (A) but not included in the subset of the items first one of the bottom-k sketches ($s_k(A,r)$);

an item selection module to select a plurality of available items of a combination of the plurality of bottom-k sketches based on determining that the predicate is an attribute-based selection, the combination (denoted herein by ($SCS_k(S,r)$) of the plurality of bottom-k sketches ($s_k(A,r)$ for A∈S) containing more than the first number (k) of the items and including any item from the bottom-k sketches ($s_k(A,r)$ for A∈S) having a respective rank less than a limiting rank (denoted herein by $r_{k+1}(S)$), the limiting rank ($r_{k+1}(S)$) being a minimum of a plurality of next largest ranks ($r_{k+1}(A)$ for A∈S) corresponding respectively to the plurality of bottom-k sketches ($s_k(A,r)$ for A∈S);

an item identification module to identify a plurality of identified items among the plurality of available items, the plurality of identified items satisfying the predicate;

an adjusted weight assignment module to assign a first adjusted weight to a first item of the plurality of identified items based on a weight of the first item and a distribution associated with the plurality of bottom-k sketches; and an estimate generation module to generate an estimate based on the first adjusted weight assigned to the first item and adjusted weights assigned to other identified items from the combination of the plurality of bottom-k sketches and that satisfy the predicate.

18. The system of claim 17, wherein the estimate is an unbiased estimate.

19. The system of claim 17, wherein the plurality of sets over a collection of items includes an overlapping set.

20. The system of claim 17, wherein the first adjusted weight is a positive adjusted weight.

21. A system comprising:

a programmable processor to implement a plurality of modules comprising:

a sample access module to access a plurality of bottom-k sketches summarizing the plurality of sets (denoted herein by S) over a collection of items, the plurality of sets (S) associated with a query having a predicate for the plurality of sets over the collection of items, a first one of the bottom-k sketches (denoted herein by $s_k(A,r)$) for a first one of the sets (denoted herein by A, which represents a set in S) including pairs of ranks and weights for a subset of the items, the ranks being determined according to a rank assignment (denoted herein by r), the subset containing a first number (denoted herein by k) of the items having smallest ranks among the items included in the first one of the sets (A), the first one of the bottom-k sketches ($s_k(A,r)$) also including a next largest rank (denoted herein by $r_{k+1}(A)$) corresponding to a smallest remaining rank among the remaining items included in the first one of the sets (A) but not included in the first one of the bottom-k sketches ($s_k(A,r)$);

an item identification module to select at least some of a plurality of items of the first or a second bottom-k sketch based on a plurality of item rankings, a first item ranking of the plurality of item rankings being associated with a first item of the plurality of items;

a predicate determination module to identify a plurality of identified items among the plurality of items, the plurality of identified items satisfying the predicate;

an adjusted weight assignment module to assign a first adjusted weight to a first item of the plurality of identified items by the item identification module based on a weight of the first item, a distribution associated with the plurality of bottom-k sketches, and a result of a distribution function associated with the weight of the first item; and an estimate generation module to generate an estimate based on the first adjusted weight assigned to the first item and adjusted weights assigned to other identified items from a combination of the plurality of bottom-k sketches that satisfy the predicate, the combination (denoted herein by ($SCS_k(S,r)$) containing more than the first number (k) of the items contained in each one of the plurality of bottom-k sketches ($s_k(A,r)$ for A∈S) and including any item from the plurality of bottom-k sketches ($s_k(A,r)$ for A∈S) having a respective rank less than a limiting rank (denoted herein by $r_{k+1}(S)$), the limiting rank ($r_{k+1}(S)$) being a minimum of a plurality of next largest ranks ($r_{k+1}(A)$ for A∈S) corresponding respectively to the plurality of bottom-k sketches ($s_k(A, r)$ for A∈S).

22. The system of claim 21, wherein the first bottom-k sketch of the plurality of bottom-k sketches is associated with the first data set and the second bottom-k sketch of the plurality of bottom-k sketches is associated with a second data set.

23. The system of claim 21, wherein the plurality of bottom-k sketches associated with the query is accessed from a database.

24. The method of claim 5, wherein the first bottom-k sketch for the first set further includes a rank value corresponding to the item in the first set having a next highest rank above the ranks included in the pairs of ranks and weights for the subset of the items.

* * * * *